Oct. 12, 1943.          R. R. CANDOR          2,331,535
                      DOMESTIC APPLIANCE
                    Filed Feb. 17, 1940          4 Sheets-Sheet 4
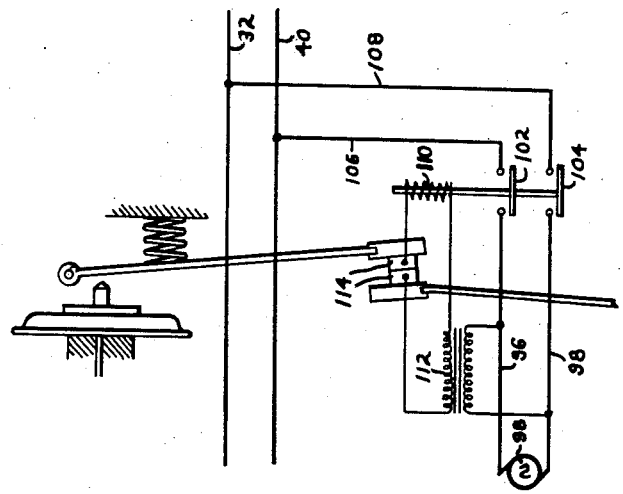
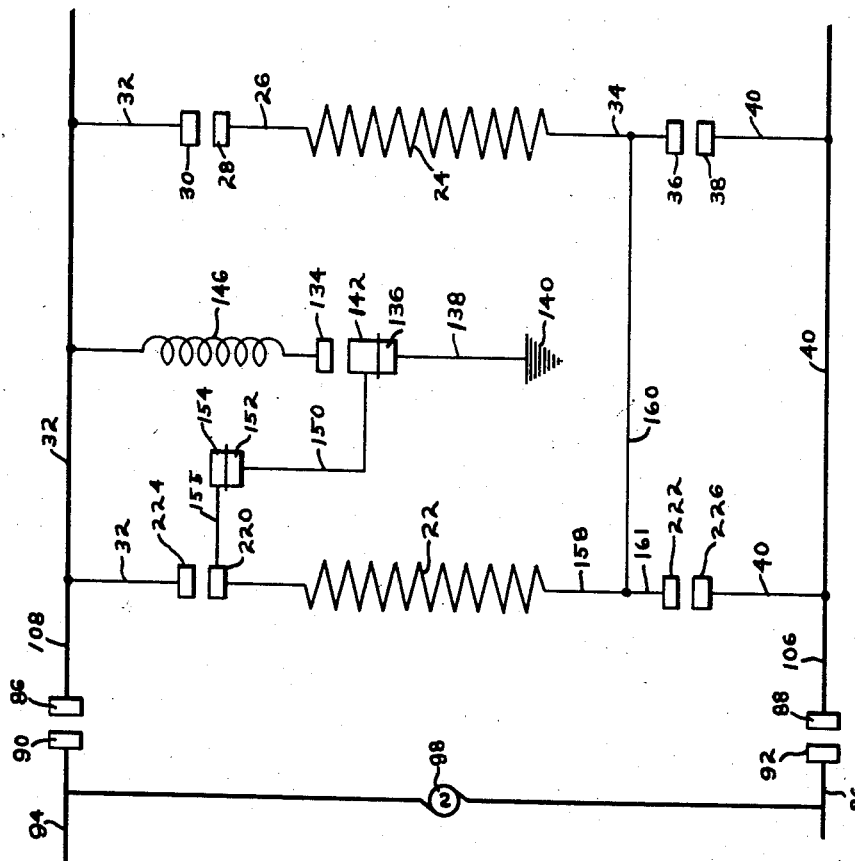
INVENTOR.
Robert R Candor
BY
Spencer Hardman and Fehr
ATTORNEYS Patented Oct. 12, 1943

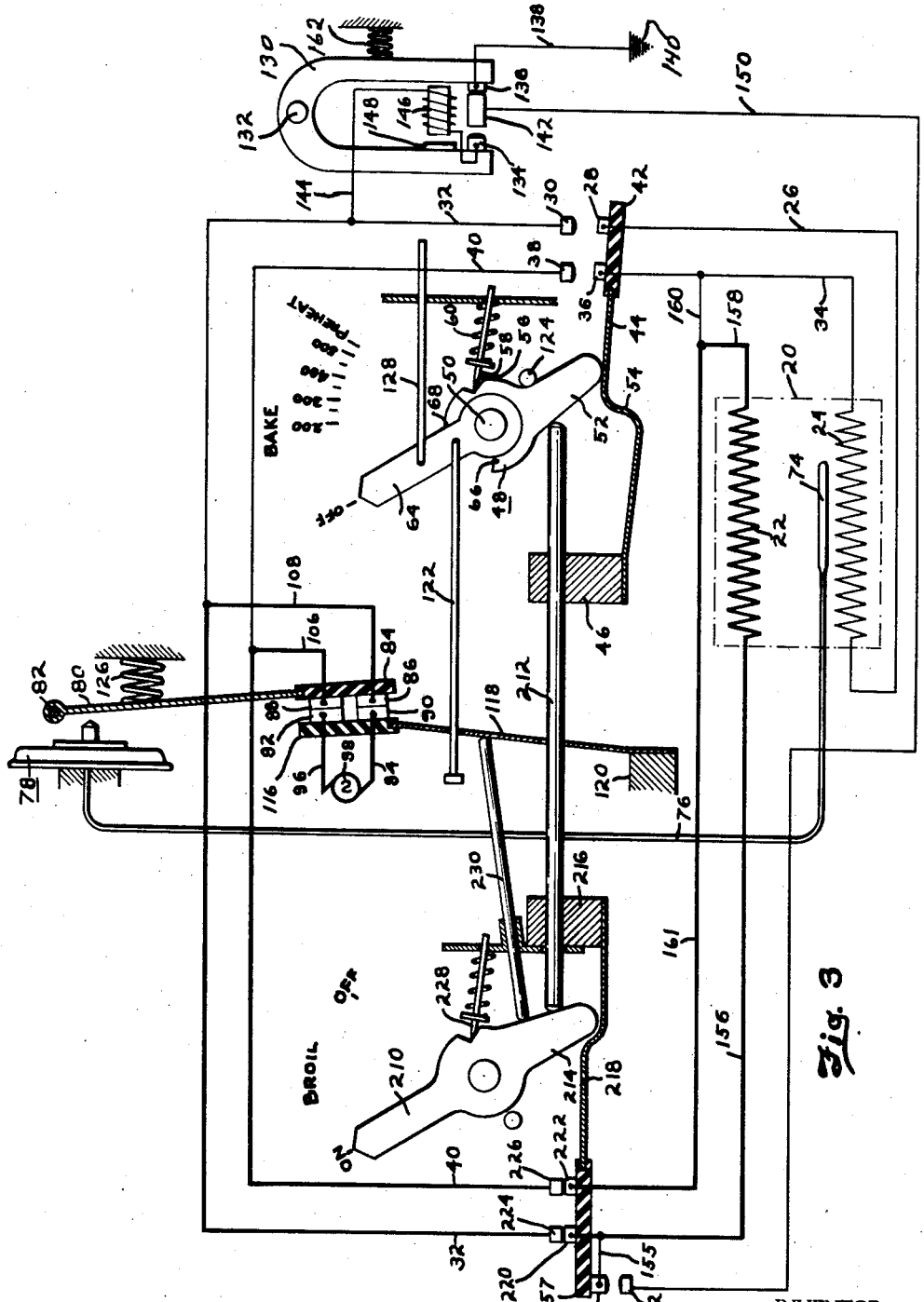

2,331,535

UNITED STATES PATENT OFFICE 2,331,535

DOMESTIC APPLIANCE

Robert R. Candor, Dayton, Ohio, assignor to General Motors Corporation, Dayton, Ohio, a corporation of Delaware Application February 17, 1940, Serial No. 319,513

3 Claims. (Cl. 219—20.4)

This invention relates to a domestic appliance and more particularly to electric oven heating systems provided with separate manipulating devices for broiling and baking.

It is an object of my invention to provide a novel oven heating system which includes separate manipulating devices for providing the broiling and baking circuit arrangements with means for preventing simultaneous energization of such circuits.

It is also an object of my invention to provide such a system with means for preheating the oven by using the maximum output obtainable by properly combining the broiling and baking circuit arrangements.

It is also an object of my invention to provide a thermostatic control for such a system providing an automatic change from preheat to the bake circuit arrangement.

It is another object of my invention to control the thermostat by one manipulating device for broiling purposes and to control the thermostat by another manipulating device for baking purposes.

Further objects and advantages of the present invention will be apparent from the following description, reference being had to the accompanying drawings, wherein a preferred form of the present invention is clearly shown.

In the drawings:

Fig. 3 is a view similar to Figs. 1 and 2 with the system in the "broil" circuit arrangement;

Fig. 4 is a simple wiring diagram of the system shown in Figs. 1, 2 and 3; and

Fig. 5 is a modified form of thermostat control for the system shown in Figs. 1 to 4.

Figure 1:
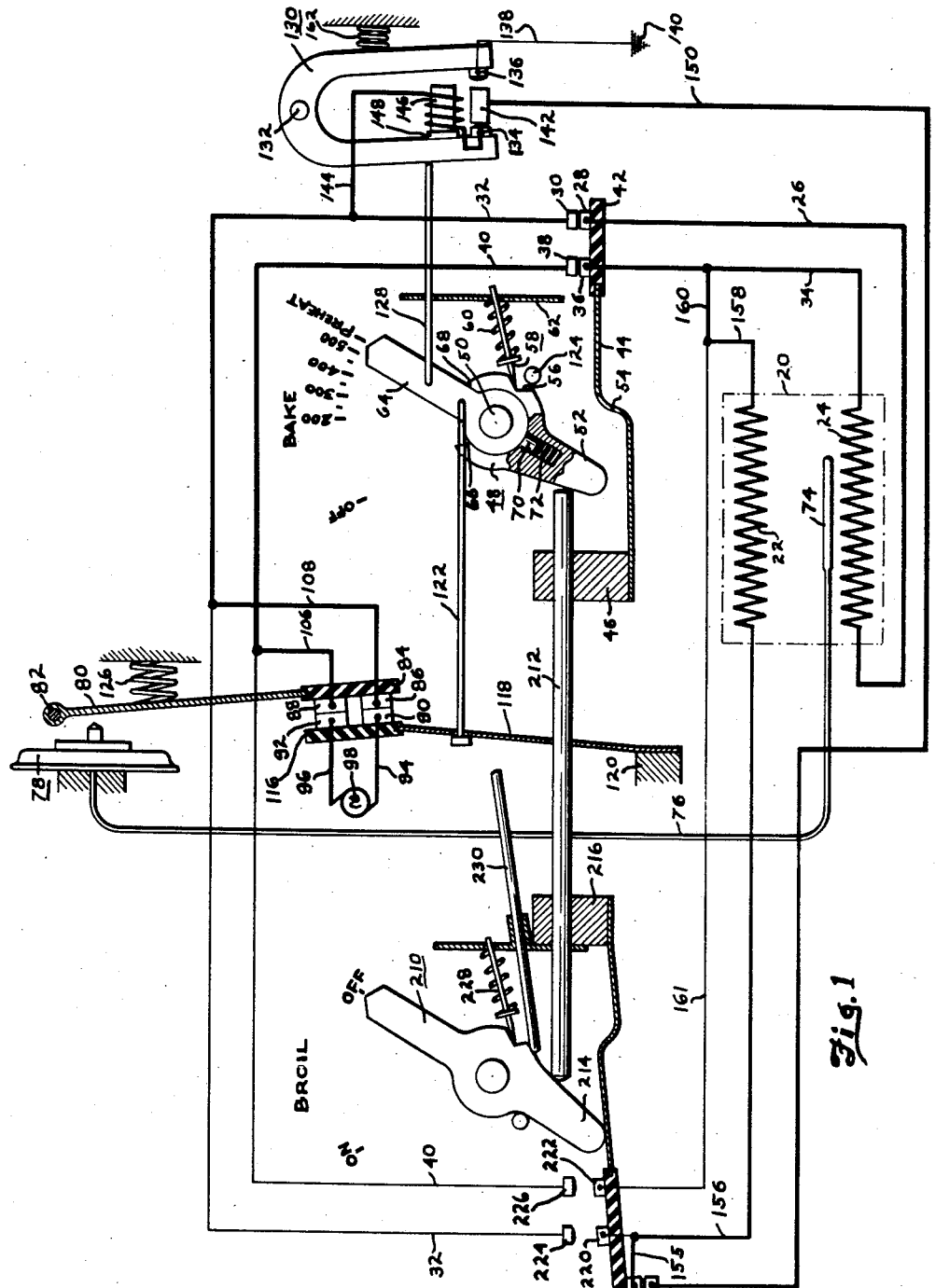
Fig. 1 is a view partly diagrammatic, showing my improved system in the "preheat" circuit arrangement.

Briefly, I have shown an electric oven heating system having an upper electric heating unit primarily for broiling purposes and a lower oven heating unit primarily for baking purposes. Separate snap acting manipulating devices are provided for controlling the energization of the broiling and baking circuits. A means is provided for preventing both devices from being "on" at the same time. In the "broil" circuit only the upper oven heating unit is energized. In the "bake" circuit arrangement the lower oven heating unit is energized at full voltage while the upper unit is energized preferably at less than half voltage. A "preheat" circuit is also provided under the control of the baking circuit manipulating device and is arranged so that the "preheat" circuit may be automatically changed to the baking circuit arrangement under the control of the oven thermostat.

Referring now to the drawings there is shown diagrammatically an electric oven 20 provided with an upper electric oven heating unit 22 and a lower electric oven heating unit 24. The lower electric heating unit 24 is connected by a conductor 26 to a movable switch contact 28 which cooperates with a stationary contact 30 which in turn is connected to the conductor 32. The other terminal of the lower unit 24 is connected by conductor 34 with a movable contact 36 which cooperates with a stationary contact 38 connected to the conductor 40. The contacts 28 and 36 are mounted upon an insulating section 42 provided upon the end of a spring-metal strip 44 anchored to a block 46, and tensioned to hold the contacts 28 and 36 in contact with the contacts 30 and 38.

The spring-metal strip 44 is operated by a toggle manipulating device 48 which is pivoted upon the pin 50. This device includes a cam nose 52 projecting downwardly from the hub section so as to engage the hump 54 of the strip 44 when moved in a counter-clockwise direction in order to move the insulating section 42 downwardly to separate the contacts 28 and 36 from the contacts 30 and 38 in order to deenergize the lower unit 24. The hub of the manipulating device 48 is provided with a notch 56 which receives the pointed end of the toggle device 58 which carries the toggle spring 60 abutting against a stationary stop plate 62 which is pierced to receive the end of the toggle device 58. This provides a snap action of the manipulating device 48 when it moves from the position shown in Figs. 1 and 2 to the position shown in Fig. 3. The manipulating device 48 is operated by a finger lever 64 having its hub mounted upon the pin 50 within and concentric with the hub of the cam nose 52. This finger lever 64 is movable between the shoulders 66 and 68 provided upon the hub of the cam nose 52. However, the hub of the finger lever 64 and the hub of the cam nose 52 have a friction connection including the button 70 and a spring 72 provided in the nose 52 in which the button bears against the hub of the finger lever 64.

The temperature maintained in the electric oven 20 is controlled by oven thermostat switch operated by a bulb 74 containing an expansible and contractible fluid and located at a suitable point within the oven 20. This bulb is connected by a capillary tube 76 to a metal diaphragm 78 which is adapted to act upon a switch lever 80 pivoted upon the pin 82 and carrying at its opposite end an insulating section 84 provided with contacts 86 and 88. A light return spring 126 is provided which will either keep the contacts closed or keep the lever 80 against the diaphragm 78. The contacts 86 and 88 cooperate with the contacts 90 and 92 to connect the entire system through the conductors 94 and 96 to a source 98 of alternating current electric energy. The contacts 86 and 88, and 90 and 92 are preferably of the slow make and break type having large flat areas. However, if desired, as shown in Fig. 5, a relay including contacts 102 and 104 may be provided for connecting the source 98 and the conductors 94 and 96 to the conductors 106 and 108 which in turn connect to the conductors 40 and 32 for supplying the oven heating units with electric energy. The relay is provided with an operating solenoid 110 energized from a transformer 112 connected across the conductors 94 and 96. The circuit including the solenoid 110 is controlled by a single set of contacts 114 which are operated by a thermostatic device otherwise similar to that shown in Figs. 1, 2 and 3, and including a diaphragm, a lever and a return spring.

Referring now again to Figs. 1 to 3 the contacts 90 and 92 are mounted upon an insulating section 116 provided upon the end of a leaf spring 118 anchored to the block 120. This leaf spring 118 is tensioned to bend to the left beyond its true vertical position. Normally oven thermostats have been adjusted by adjusting the location of the diaphragm 78. In my system I adjust the thermostat by adjusting the location of the contacts 90 and 92. For baking and preheating purposes the location of the contacts 90 and 92 are adjusted by a pull rod 122 which is connected to finger lever 64 and which deflects the leaf spring 118 a desired amount. With this arrangement the finger lever 64, by its engagement with the shoulders 66 and 68, may be used to operate the cam nose 52 to either of its positions under the control of the snap acting device 58 in order to open or close the contacts 28 and 36. A stop pin 124 is provided for engaging the cam nose 52 to limit its movement in the "off" position while a push rod 212 limits its movement in the "on" position.

Figure 2:
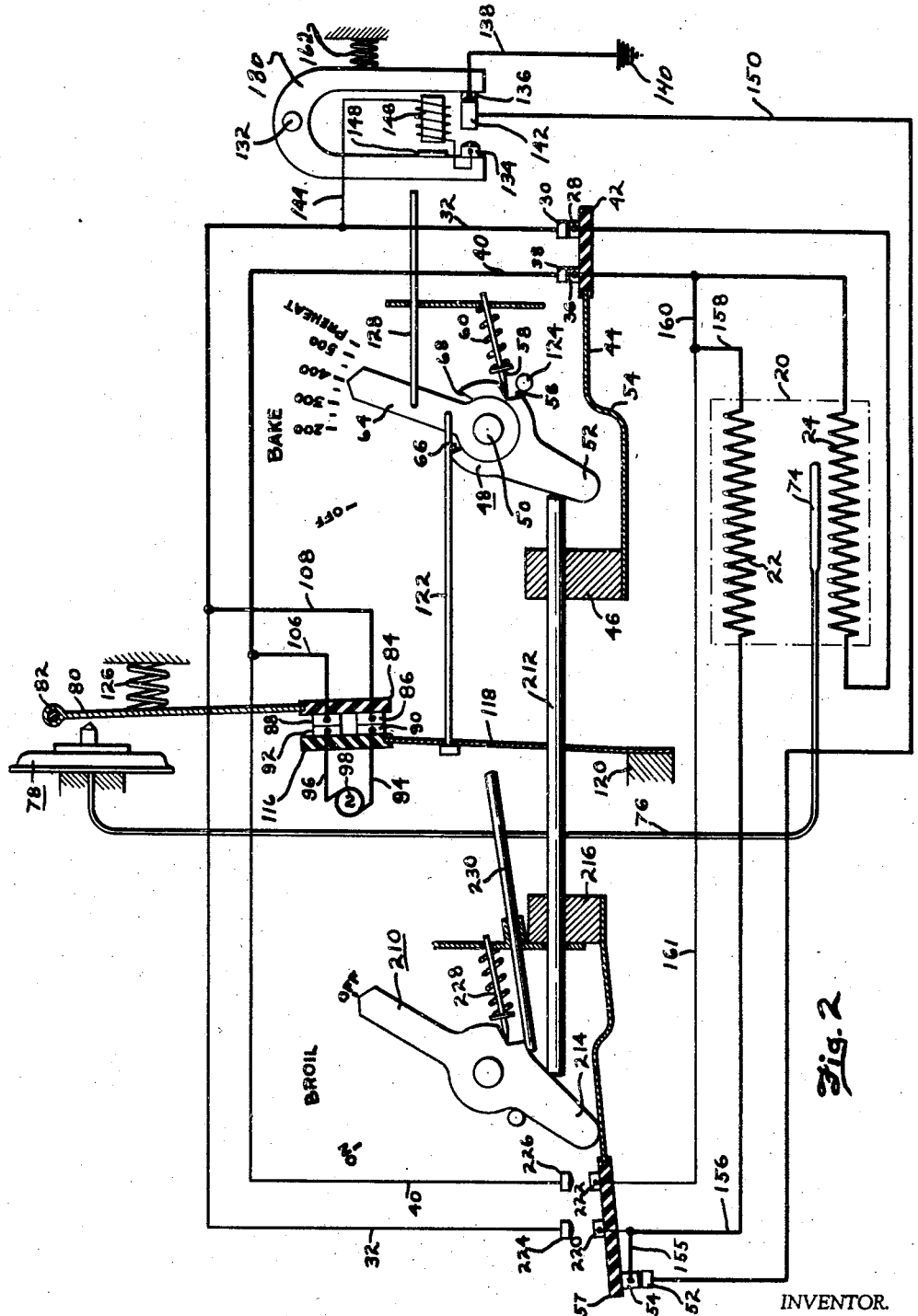
Fig. 2 is a view similar to Fig. 1 with the system in the "bake" circuit arrangement.

However, the finger lever 64 is capable of movement independently of the cam nose 52 and can be set to various bake temperature positions indicated on Figs. 1, 2 and 3 whenever the manipulating device 48 is moved away from the "off" position to a position where the contacts 28 and 36 are closed. Any suitable range of temperatures may be provided. As shown temperatures of from 200° to 500° are provided and the finger lever 64 may be set at any point within this range by moving it to any point between the shoulders 66 and 68. The friction button device 70 provides sufficient friction to hold the contacts 90 and 92 in the desired position corresponding to the bake temperature selected. This friction device should be stronger than the combined forces of the leaf spring 118 and the return spring 126, provided for the lever 80. It will be apparent that by moving the finger lever to various positions the location of the contacts 92 and 90 will be so adjusted by the pull rod 122 as to control the temperature at which the contacts 90 and 92 will be separated from the contacts 86 and 88 by the engagement of the operating pin of the diaphragm 78 with the lever 80. The opening of these slow make and break contacts will deenergize all circuits in the system.

Fig. 1 shows the system in the "preheat" circuit arrangement and the heavy lines show all energized or closed circuits. In this "preheat" position a push rod 128 operated by the finger lever 64 when in preheat position engages an inverted U-shaped electromagnetic device 130. This device 130 is pivoted upon the pin 132 and carries the contacts 134 and 136. The contact 136 is connected by the conductor 138 to the ground or neutral conductor 140 which, together with the conductors 94 and 96, provide the familiar three-wire Edison circuit providing 230 volts across the conductors 94 and 96, and 115 volts across either of these conductors and the conductor 138. The engagement of the push rod 128 with the device 130 causes the engagement of the contact 134 with a double stationary contact 142. This closes a circuit in parallel with the previously described circuit which includes the lower unit 24.

This parallel circuit includes a conductor 144 connected to the conductor 32 and extending to a stationary electromagnet 146 which cooperates with an armature 148 provided upon the U-shaped member 130 pivoted upon the pin 132. This electromagnet 146 has only sufficient power to hold the armature 148 when the contacts 134 and 142 are engaged. The electromagnet 146 is connected to the contact 134 by a flexible conductor. As mentioned before the contact 134 cooperates with the stationary contact 142 which in turn is connected by the conductor 150 to a stationary contact 152 which in turn cooperates with the movable contact 154 mounted upon an insulating section 157 of the broil switch mechanism. The contacts 152 and 154 are closed whenever the broil switch mechanism is open. The contact 154 is connected by a short shunt 155 with the conductor 156 which connects with one terminal of the broiling unit 22 located in the upper portion of the oven. The other terminal of the broiling unit 22 is connected by a conductor 158 and a conductor 160 to the conductor 34 which in turn connects through the contacts 36 and 38 with the conductors 40 and 106, the contacts 88 and 92 and the conductor 96.

Thus a preheat circuit arrangement is provided supplying electric energy at full voltage for both the upper and lower heating units in order to quickly preheat the oven under the control of the oven thermostat. In operating the device 48, the lever 64 is first moved to the "preheat" position thus energizing all preheat circuits by the closing of the thermostat contacts and the bake contact as well as the contacts 134 and 142. The closing of contacts 134 and 142 energizes the electromagnet 146 to cause it to hold the armature 148. Thereafter the finger lever 64 may be moved to any desired baking position without disrupting the preheat circuit. As soon as the oven 20 reaches the desired temperature the thermostat bulb 74 will have expanded the operating fluid sufficiently to cause the diaphragm 78 to engage the lever 80 and separate the thermostat contact thereby deenergizing all circuits. This will also deenergize the electromagnet 146 and allow the U-shaped device 132 to move in a clockwise direction under the influence of the return spring 162 which will cause the engagement of the contact 136 with the contact 142. This changes the circuit connections to provide a baking circuit arrangement as shown in Fig. 2. In this arrangement the circuits are the same excepting that the contact 136 now connects with the contact 142 thereby connecting the terminals of the upper heating unit to the conductors 34 and 140 thereby energizing the upper unit 22 at 115 volts while the lower unit 24 remains energized at 230 volts. The conductor 138 may be provided with an additional resistance in order to further reduce the energization of the upper unit 22 in order to provide better heat distribution within the oven for baking purposes. The thermostats 78—80 will cycle to control the energization thereafter in the baking circuit arrangement of the upper and lower heating units at these different voltages in order to maintain the baking temperature of the oven under proper baking conditions.

For broiling, the upper unit 22 alone is energized as shown in Fig. 3. In order to broil, the "broil" manipulating mechanism 210 is moved to the "on" position and automatically the baking manipulating mechanism 48 is moved to the "off" position through a push rod interconnection 212 which extends between the cam nose 52 and the cam nose 214 provided on the "broil" manipulating device 210. This push rod slides in the anchoring blocks 46 and 216, the latter also supporting the spring-metal strip 218, which at its outer end is connected to the insulating section 157. This insulating section 157 supports the movable contacts 220 and 222 as well as the contact 154 previously mentioned. The movable contacts 220 and 222 are connected by the conductors 156 and 161 to the terminals of the upper unit 22. The contacts 220 and 222 cooperate with the stationary contacts 224 and 226 which connect to the conductors 32 and 40 to provide the terminals of the upper unit 22 with electric energy at 230 volts.

The "broil" manipulating device 210 includes a toggle snap action control 228 similar to the snap action control 58 provided for the "bake" manipulating device 48. The temperature during broiling is regulated by a push rod 230 which is operated by the cam nose 214 to engage the spring strip 118 to move the contacts 90 and 92 to the proper high temperature position for broiling purposes. This will allow the upper heating unit to operate continuously under normal broiling conditions and yet will deenergize the circuit in event that temperatures within the oven become excessively high. If desired this push rod 230 may be eliminated by providing a suitable collar upon the interconnecting rod 212 for properly engaging and deflecting the leaf spring strip 118. It should be noted that the movement of either the "bake" manipulating device or the "broil" manipulating device will automatically move the other device to the "off" position so that only one circuit arrangement is possible at any one time.

The wiring diagram in Fig. 4 shows a number of the safety features of this oven system. This system provides a means for disconnecting both terminals of each of the heating units from the source of supply even though the thermostat contacts are in closed position. Under such conditions these units will be normally connected to the ground conductor so that extreme safety is provided.

While the form of embodiment of the invention as herein disclosed, constitutes a preferred form, it is to be understood that other forms might be adopted, all coming within the scope of the claims which follow.

What is claimed is as follows:

1. In combination, an electric oven, a broil circuit producing broiling conditions in said oven, a preheat circuit producing preheating conditions in said oven, a bake circuit producing baking conditions in said oven, temperature responsive means for changing from preheat circuit to the bake circuit, separate manipulating means having separate control positions for controlling the energization of different ones of said circuits, and means for preventing the simultaneous movement of said separate manipulating means to said separate control positions by said separate manipulating means to prevent burning of food placed in said oven.

2. In combination, an electric oven, a broil circuit producing broiling conditions in said oven, a preheat circuit producing preheating conditions in said oven, a bake circuit producing baking conditions in said oven, temperature responsive means for changing from preheat circuit to the bake circuit, a plurality of separate manipulating means having respective energizing positions for controlling the energization of a plurality of said circuits, means for preventing the simultaneous movement of said separate manipulating means to be their respective energizing positions to prevent improper heating of food placed in said oven, and an oven temperature regulating device responsive to temperature in said oven and adjusted by one of said separate manipulating means.

3. In combination, an electric oven, a broil circuit producing broiling conditions in said oven, a preheat circuit producing preheating conditions in said oven, a bake circuit producing baking conditions in said oven, temperature responsive means for changing from preheat circuit to the bake circuit, two separate manipulating means having separate control positions for controlling the energization of different ones of said circuits, and one of said separate manipulating means having control positions for adjusting said temperature responsive means, and means for preventing the simultaneous movement of said separate manipulating means to said separate control positions by said separate manipulating means to prevent burning of food in said oven.

ROBERT R. CANDOR.